United States Patent [19]
Luckow

[11] Patent Number: 5,938,020
[45] Date of Patent: Aug. 17, 1999

[54] CD-CASSETTE WITH HOLDER

[76] Inventor: Hans-Jürgen Luckow, Rhener Kehre 10, D-24558 Henstedt-Rhen, Germany

[21] Appl. No.: 09/001,045

[22] Filed: Dec. 30, 1997

[30] Foreign Application Priority Data

Jan. 25, 1997 [DE] Germany ............... 197 02 667

[51] Int. Cl.⁶ .................................. B65D 85/57
[52] U.S. Cl. ....................... 206/308.1; 206/310
[58] Field of Search .................. 206/308.1, 309, 206/310, 312, 404, 389; 312/9.47, 9.48, 9.21, 9.22

[56] References Cited

U.S. PATENT DOCUMENTS

| | | | |
|---|---|---|---|
| 3,612,233 | 10/1971 | Nagpal | 206/389 |
| 5,361,903 | 11/1994 | Thiele | 206/312 |
| 5,385,231 | 1/1995 | Nowotny | 206/309 |
| 5,515,968 | 5/1996 | Taniyama | 206/310 |
| 5,533,615 | 7/1996 | McCamy | 206/310 |
| 5,551,559 | 9/1996 | Roth et al. | 206/308.1 |
| 5,586,651 | 12/1996 | Krummenacher | 206/310 |
| 5,687,842 | 11/1997 | Matsumoto | 206/312 |

FOREIGN PATENT DOCUMENTS

| | | |
|---|---|---|
| 0 330 292 | 10/1985 | European Pat. Off. . |
| 0 302 549 | 2/1989 | European Pat. Off. . |
| 0 671 743 A2 | 3/1995 | European Pat. Off. . |
| WO 93/01598 | 1/1993 | WIPO . |
| WO 93/12993 | 7/1993 | WIPO . |

Primary Examiner—David T. Fidei
Attorney, Agent, or Firm—Harness, Dickey & Pierce, P.L.C.

[57] ABSTRACT

The cassette is used for the storage of compact disks and it includes a lower shell and an upper shell, which is pivotably connected to the lower shell. At least one release button, in a starting position, holds the upper shell in a fixed location relative to the lower shell. In a release position, the release button allows the pivoting of the upper shell relative to the lower shell. After pivoting the upper shell upwardly relative to the lower shell, the compact disk is released without any significant clamping force being applied. When the upper shell is pivoted upwardly relative to the lower shell, the compact disk is released essentially without the application of a clamping force. When the upper shell is pivoted upwardly relative to the lower shell the compact disk is essentially free of overlap in a central opening with respect to the lower shell. It is likewise possible, without carrying out a release function, to merely provide for assistance in the handling ability by providing a retaining element, which is free of overlap relative to a by-pack element.

21 Claims, 13 Drawing Sheets

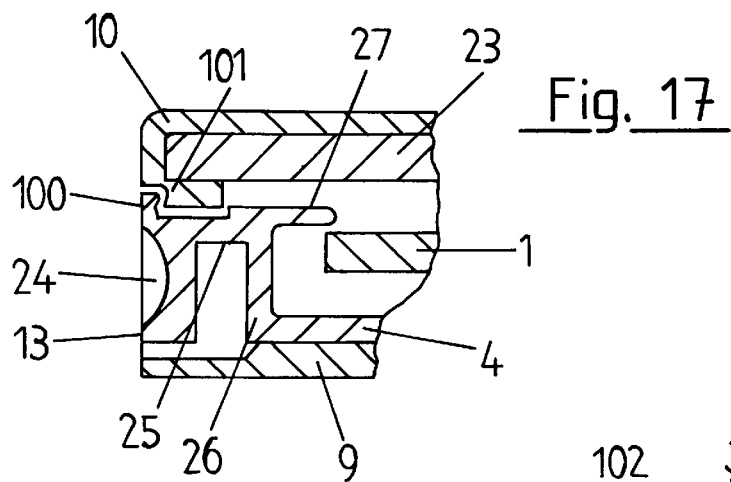
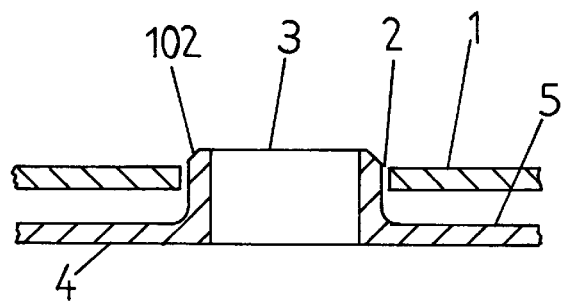
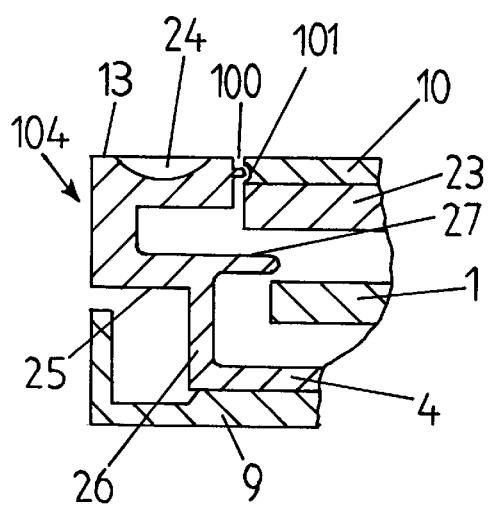
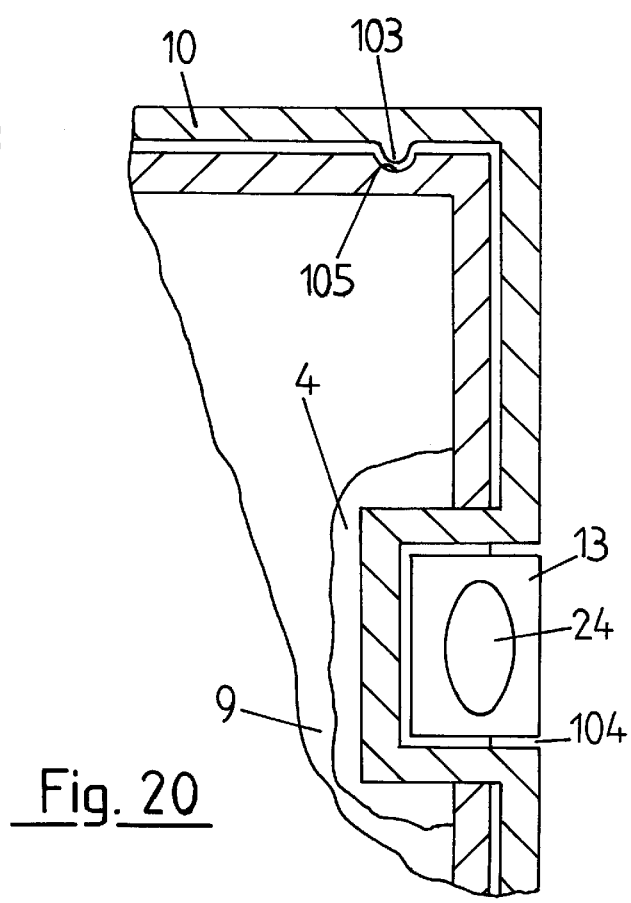
Fig. 17
Fig. 18
Fig. 19
Fig. 20

CD-CASSETTE WITH HOLDER

BACKGROUND AND SUMMARY OF THE INVENTION

The invention concerns a cassette for the storage of compact disks, which includes a lower shell and an upper shell pivotably connected to the lower shell, and where at least one release button in a starting position holds the upper shell in a fixed location relative to the lower shell, and in a release position allows the upper shell to be pivoted relative to the lower shell and where, after pivoting the upper shell upwardly relative to the lower shell, the compact disk is released without any significant clamping force having been applied.

The invention concerns further a cassette for the storage of compact disks, which contains a lower shell and an upper shell which is pivotably connected to the lower shell and where at least one retaining arrangement, is supported in a starting position by the lower shell and protrudes through an opening of the upper shell and where it is released in a release position by the upper shell after the upper shell is pivoted relative to the lower shell.

Likewise, the invention concerns a cassette for the storage of compact disks, which contains a lower shell and an upper shell which is pivotably connected to the lower shell, and where at least one release button, in a starting position, holds the compact disk in place relative to the lower shell, and where in a release position, a pivoting movement of the upper shell relative to the lower shell causes the compact disk to be released relative to the lower shell at least in the region of the release button.

Such cassettes for the storage of compact disks are available in many different embodiments. Receiving containers with retaining elements are known, which can be equipped, depending on the type of application, for holding one, two or three compact disks in place. The compact disks are held in place primarily in the region of a central opening of the compact disks. It is also known, however, to carry out a lateral clamping in the region of an edge of the compact disks. In the case of a retention in the region of the central opening, clamping elements are used which are located along the circumference of the central opening of a supporting surface and which are urged elastically in the direction of the center of the central opening when the compact disks are pushed into position and which subsequently spring back in order to retain the compact disk.

A cassette having a release button which is located in the region of a corner is described in EP-OS 0 671 743. The release button is molded as part of an insert for the lower shell to which it is joined by a thin connecting strip. When the release button is pushed down it is pivoted relative to the insert and releases the upper shell of the cassette as well as an edge of the compact disk. While the release button is being held down, the lid of the cassette can now be opened and the compact disk removed. In the region of a central opening of the compact disk a portion of the interior edge is extended below the locking arrangement which protrudes beyond the edge. By this means, while the compact disk is in a locking position, it is secured against forces acting transversely to the supporting surface.

In the WO 93/12993 a further cassette with a release button is described. The release button is also located in a corner region. However, in this embodiment the release button serves exclusively for releasing and locking the lower shell of the housing with respect to the upper shell of the housing. A contact with the compact disk is not contemplated.

In the WO 93/01598 a cassette for the storage of compact disks is described where in the region of a central retaining element, which has the function of reaching into the central opening of the compact disk, a release button has been provided. The release button is supported elastically and initiates a pivoting movement of locking elements when a pressure load is applied to it, which locking elements protrude beyond the interior edge of the compact disk in a locking position. After a pivoting movement, the interior edge of the compact disk is released and the compact disk can be removed. After the release of the push button, it returns to its starting position as a result of the spring action and again puts the locking elements in the locking position. When the compact disk is inserted, an evasive movement of the locking elements is automatically carried out by means of entry tapers, so that they can hold the compact disk in place without any actuation of the push button.

The known devices with release mechanisms cannot yet satisfy all the requirements, which are made in the later applications with respect to a cost-effective method of manufacture, a high degree of reliability in its use, a simple way of operating it as well as a significant scope regarding design alternatives for later applications.

It is an objective of the present invention, therefore, to construct a cassette of the type mentioned in the introduction in such a way that its operating ability is improved.

This objective is achieved in accordance with the invention by positioning the compact disk essentially without any undercuts when the upper shell is tilted upwardly relative to the lower shell in the region of a central opening of the compact disk.

It is a further objective of the present invention to facilitate a simplified way of handling it while the design of the cassette is kept simple.

This objective is achieved according to the invention in that the clamping arrangement has a width at an edge, which faces away from the lower shell and is directed toward the pivoting arrangement, which width at most equals a distance of a by-pack element, which is supported by the upper shell, to the edge of the lower shell, which faces away from the direction of pivoting.

Also, one objective of the present invention consists in supporting a simplified operation as well as a favorable application of the locking forces to the lower shell.

This objective is achieved according to the invention in that the compact disk, when the upper shell is in a position where it is tilted upwardly relative to the lower shell, is located essentially free of undercuts with respect to the lower shell in the region of a central opening of the compact disk, and that the release button exclusively holds the compact disk in place relative to the lower shell without applying any locking force to the upper bowl.

By the arrangement of the central opening of the compact disk, which is essentially free of undercuts within the cassette, the removal of the compact disk from the cassette is made easier, because only low levels of force need to be exerted by the user.

In order to facilitate a part geometry, which makes it easy to use automatic manufacturing equipment, it is proposed that the upper shell contain a receptacle for supporting an essentially rectangular by-pack element.

A further design simplification can be achieved by making it possible to retain the compact disk within the lower shell by means of retaining-protrusions on the upper shell.

For the further improvement of the functional reliability it is proposed that at least two of the retaining protrusions be located at varying distances from a pivot hinge, which connects the upper shell with the lower shell.

Another possibility for carrying out the design consists in positioning the release button in a lateral region of the cassette.

An additional improvement with respect to holding the compact disk in place within the cassette can be achieved by holding the release button in a locking position where it holds the upper shell in place with respect to the lower shell as well as the compact disk within the cassette.

As an alternative or an additional measure for holding the compact disk in place in the region of its central opening it may be contemplated to arrange at least one retaining element within the cassette along an outer edge of the compact disk.

A distributed introductory force with a reduction in the amount of material used can be achieved by placing at least two retaining elements in at least one corner region of the cassette.

Holding the compact disk in place vertically with respect to the support surface can be facilitated when the retaining element contains a boundary ridge which in some regions protrudes beyond the compact disk.

To facilitate a placement of the compact disk in the cassette it is proposed that the boundary ridge take the form of a locking projection which has a lead-in taper.

A further variant for localizing the release function consists in that the release button may be placed in the region of a ridged edge of the cassette.

It is likewise possible that the release button be positioned opposite the pivot hinge in order to ensure a good accessibility to the individual functional components.

A further possibility of making it easier to hold the compact disk in place inside the cassette consists in equipping the cassette with a cylinder-like central element, which can be inserted into a central opening of the compact disk.

Having the compact disk assume an intended position within the cassette can be facilitated if the central element contains an adjustment taper for positioning the compact disk within the cassette.

A further material savings can be accomplished by constructing the central element of ridges which protrude with respect to a reference plane and which are separated by certain distances.

In the drawings examples of embodiments of the invention are shown schematically.

BRIEF DESCRIPTION OF THE DRAWINGS

FIG. 17 is a view similar to that of FIG. 10 but showing a release button incorporating a locking arrangement to fix the upper shell relative to the lower shell;

FIG. 18 is a view similar to that of FIG. 1 but showing an adjusting taper to aid in positioning the compact disk as it is placed in the case;

FIG. 19 is a view similar to that of FIG. 10 but showing a section view of the embodiment shown in FIG. 8; and FIG. 20 is a fragmentary plan view of the embodiment shown in FIG. 19 and also showing an edge profile for holding the upper shell in position relative to the lower shell.

DESCRIPTION OF THE PREFERRED EMBODIMENT

Figure 1:
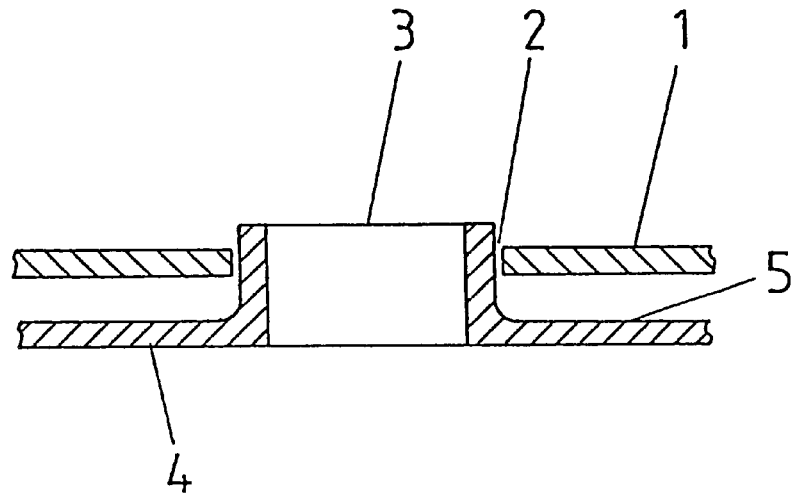
FIG. 1 is a fragmentary cross-section view of a compact disk and associated holder in which the compact disk is retained in the region of its central opening.

FIG. 1 shows the retaining of a compact disk 1 in the region of a central opening 2 by a central element 3 in a cross-sectional view. The central element 3 is held in place by a plate-like insert 4 and rises somewhat cylindrically above a reference plane 5 generated by an insert 4.

The central element 3 can be constructed as a centering means, which merely serves for positioning the compact disk 1 in a radial direction relative to the insert 4 and which may be at a distance from the edge of the compact disk 1. But it is also possible to construct the central element 3 as a retaining element which transmits retaining forces to the compact disk 1. Additionally, if desired central element 3 may be provided with an adjustment taper or chamfer 102, as shown in FIG. 18, at the upper edge thereof to assist in positioning the compact disk within the cassette.

Figure 2:
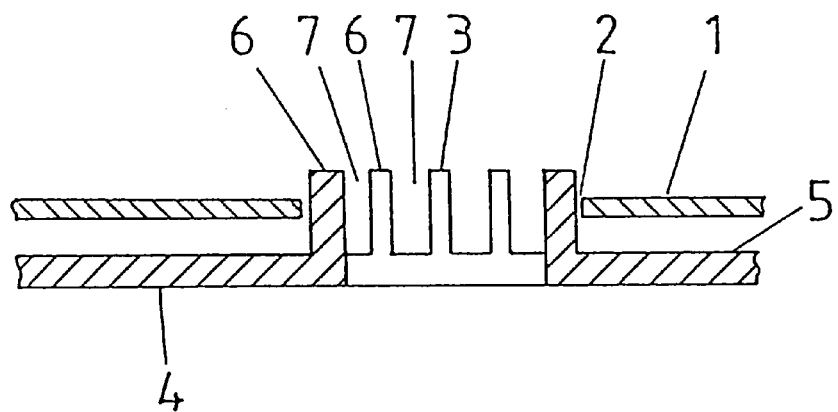
FIG. 2 is a view similar to that of FIG. 1 but showing a compact disk supported by a lamella-like cylindrical element.

According to the embodiment in FIG. 2 the central element 3 is constructed from ridges 6 between which spacings 7 are extended. The ridges 6 rise above the insert 4 and define an essentially cylindrical basic contour.

Figure 3:
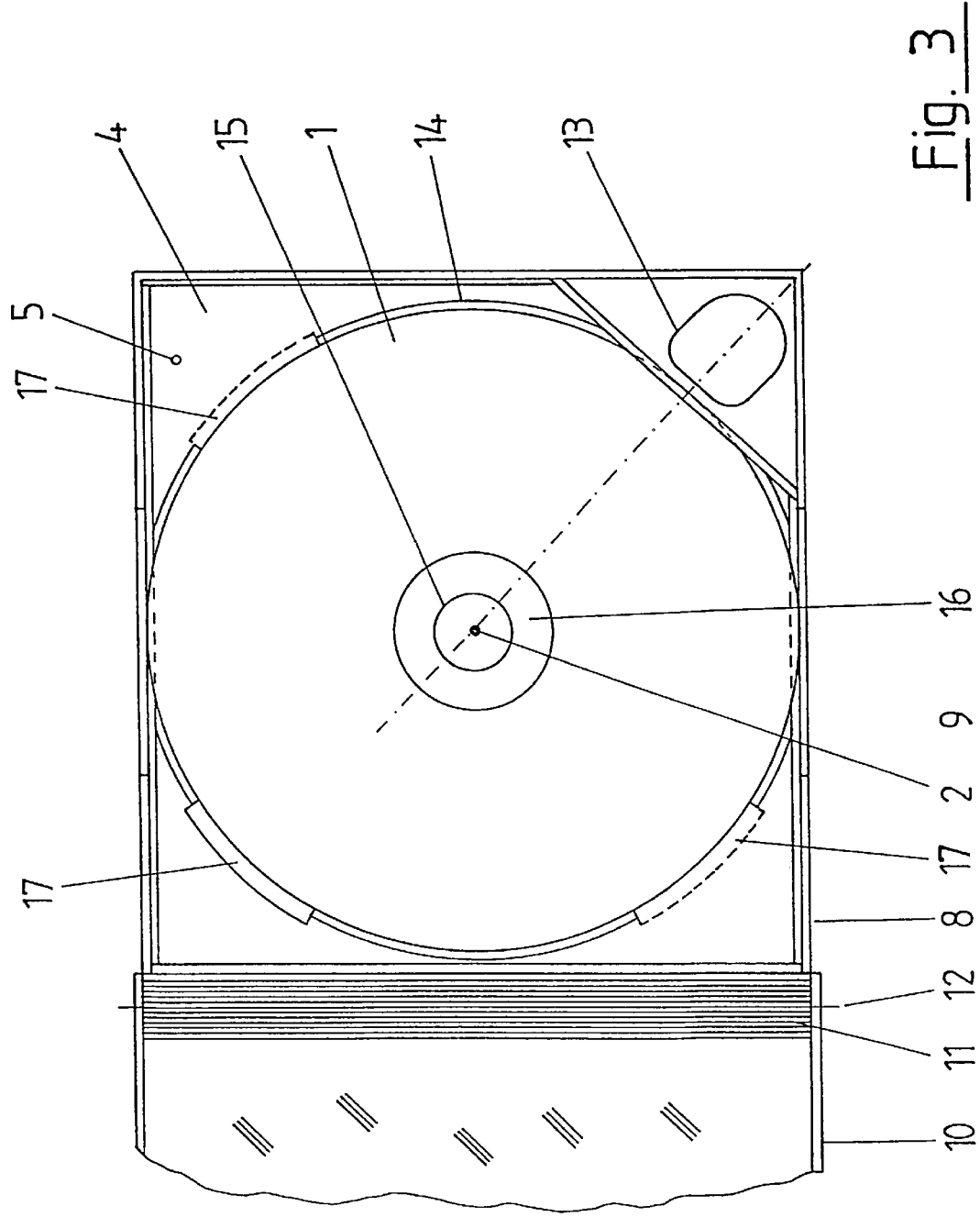
FIG. 3 is a top view of an opened cassette where compact disk retaining elements are placed along an outer edge of the compact disk and where the release button is provided in the region of a corner.

From FIG. 3 it can be seen that the compact disk 1 can be received by a cassette 8, which has a lower shell 9 and an upper shell 10. The insert 4 is placed inside the lower shell 9.

The lower shell 9 contains a ridged edge 11 which extends across the reference plane 5, in the region of which a pivot hinge 12 is provided which facilitates rotary motions between the upper shell 10 and the lower shell 9. The pivot hinge 12 can, for example, be constructed from journals and corresponding bores.

In a corner region of the lower shell 9 a release button 13 is placed, which as a minimum carries out the function of a detachable locking action between the lower shell 9 and the upper shell 10. In addition, it is being contemplated in particular to apply a force by the release button 13 in the region of the outer edge 14 of the compact disk 1.

In the embodiment presented in FIG. 3 it is being contemplated to construct the insert 4 in the region of the central opening 2 of the compact disk 1 essentially without any material. Merely in the area near an interior edge 15 of the compact disk 1 a support console 16 is contemplated which contacts the compact disk 1 in an area thereof which is not intended to be used for storage of information. But it is also conceivable to use a central element 3 that, for example, does not effect any retention of the compact disk 1, but merely performs a centering function.

In order to ensure that the compact disk 1 is held in place within the cassette 8, at least one retaining element 17 is positioned along an outer edge 14, which retaining element is molded in place as part of the insert 4. According to the embodiment of FIG. 3 the retaining element 17 is placed in corner region of the cassette 8 opposite the release button 13. It is also possible to use additional retaining elements 17, which are shown with dotted lines, which are likewise preferably located in the corner regions of the cassette 8.

Figure 4:
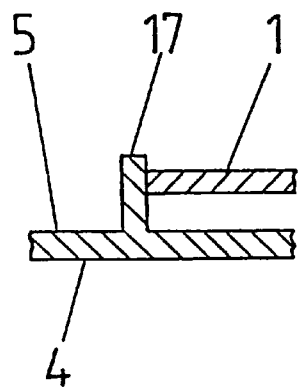
FIG. 4 is an enlarged fragmentary view of an outer edge of a compact disk shown in relation to a lateral retaining element.

FIG. 4 shows in a cross-sectional view an embodiment construction of the retaining element 17 as a support ridge, which essentially causes a positioning of the compact disk 1 in a radial direction relative to the central opening 2.

Figure 5:
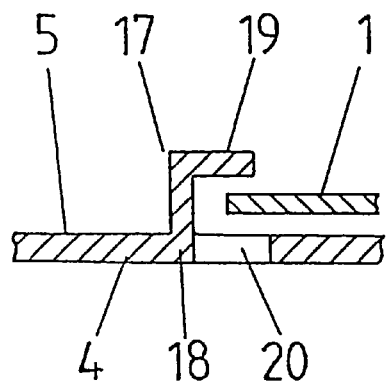
FIG. 5 is a fragmentary view similar to FIG. 4 but showing an outer edge of the cassette protruding beyond the inner edge of the retaining element.

According to FIG. 5, it is contemplated to form the retaining elements 17 in the form of a vertical ridge 18 and a boundary ridge 19 where the vertical ridge 18 rises essentially vertically above the reference plane 5 and the boundary ridge 19 extends essentially parallel to the reference plane 5.

In order to make it easier to manufacture it by an injection molding process, it is being contemplated in particular to provide an opening 20 within the insert 4 below the boundary ridge 19, in order to simplify the mold.

Figure 6:
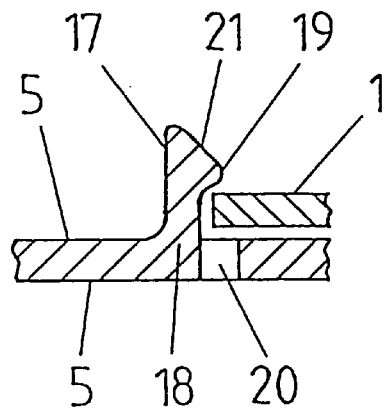
FIG. 6 is a further fragmentary view similar to FIG. 4 but showing a retaining element protruding beyond the outer edge of the compact disk like a locking lug, which includes a lead-in taper.

A further variant is shown in FIG. 6. The boundary ridge 19 is formed in this case as a locking lug, which in addition is equipped with a lead-in taper 21 in the region of its extension, which faces away from the opening 20.

Figure 7:
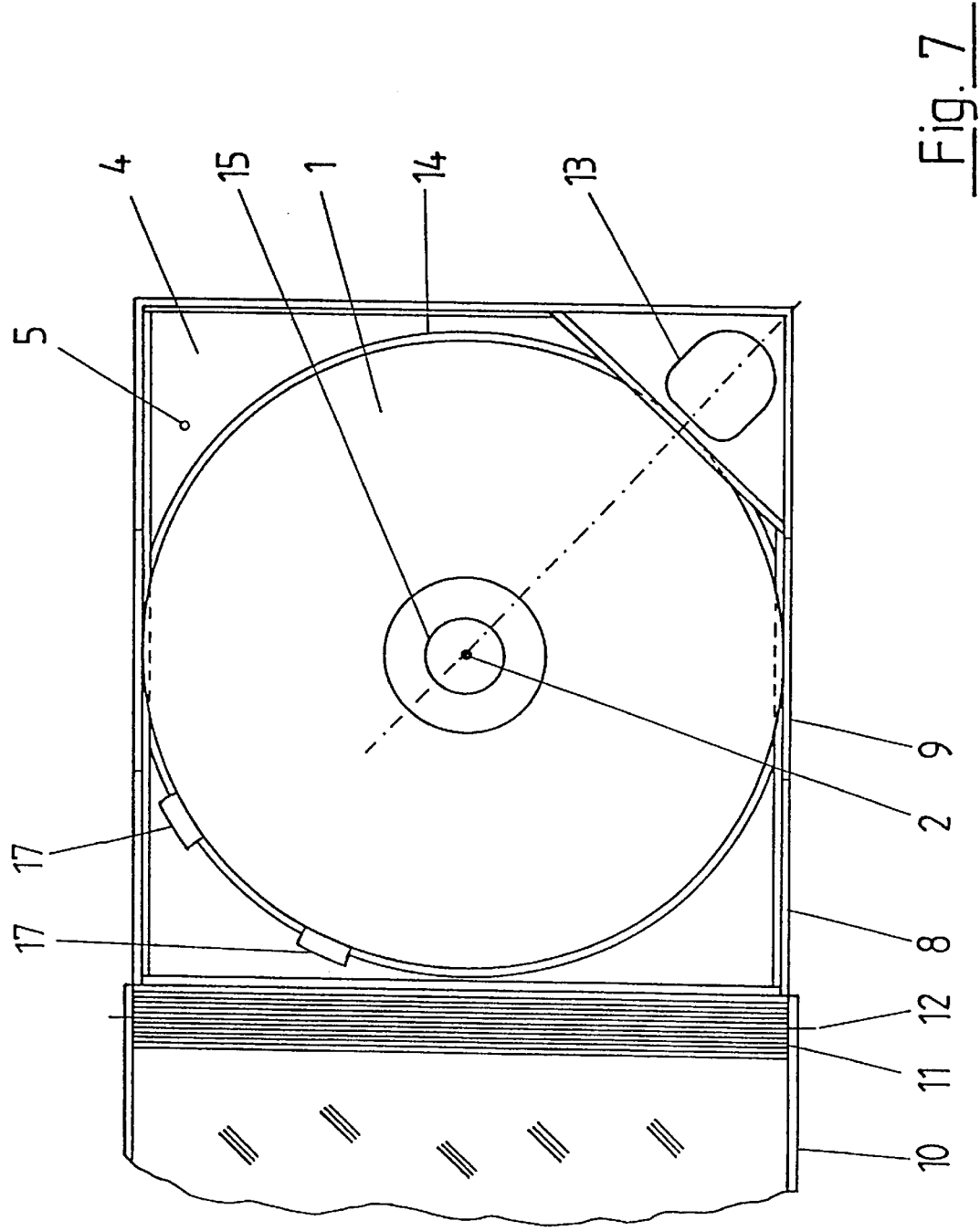
FIG. 7 is a view similar to FIG. 3 but showing an opened cassette including segmented retaining elements.

In the variant of the embodiment according to FIG. 7, an arrangement of the release button 13 is shown, which essentially corresponds to that of the presentation of FIG. 3. The retaining element 17 is, however, segmented inside one of the corner regions of the cassette 8. In the embodiment shown in the drawing two partial segments of the retaining element 17 are provided. However, it is also possible to provide a more pronounced segmentation, or to provide such segments also in the region of other corners of the cassette 8.

Figure 8:
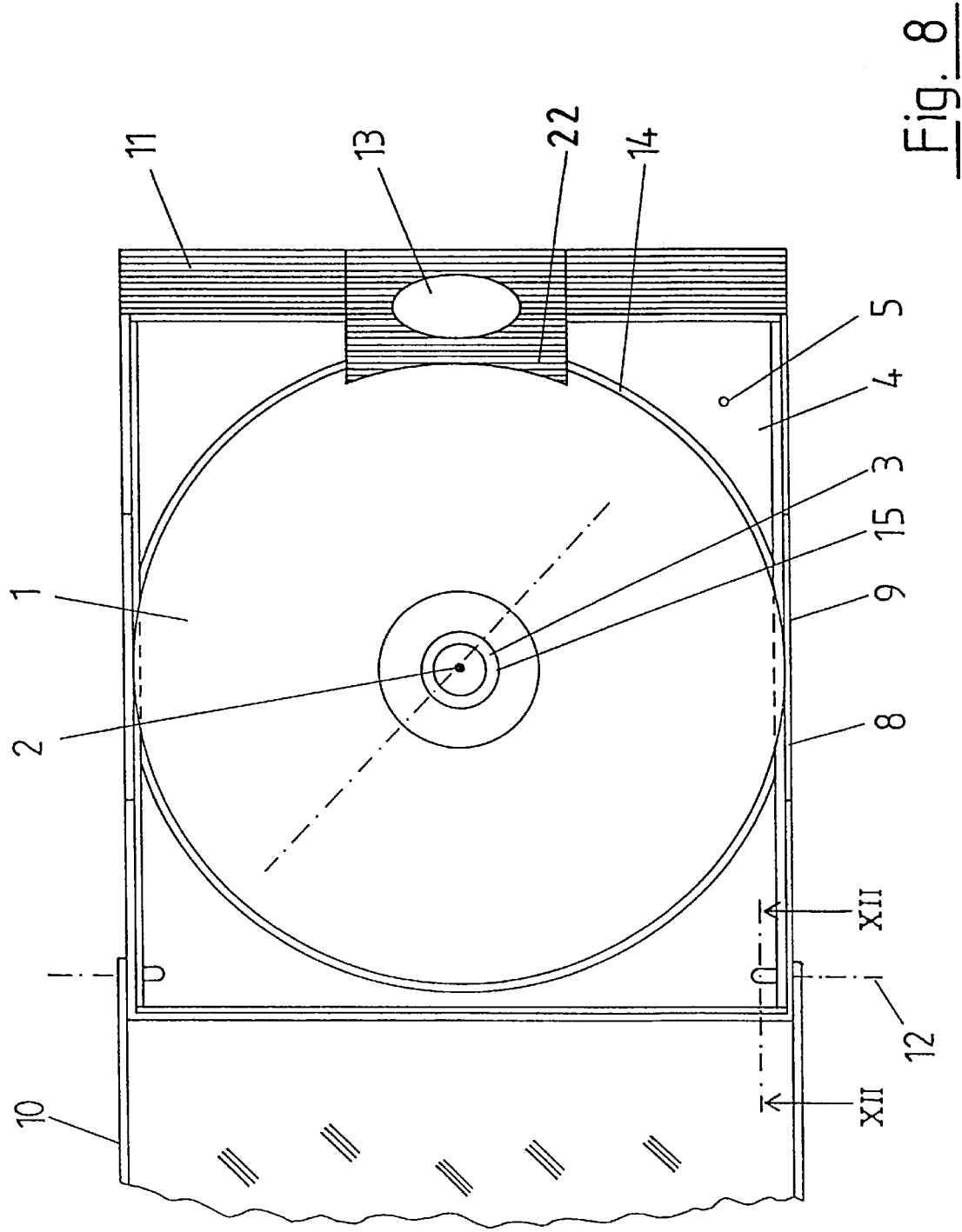
FIG. 8 is a view similar to FIG. 3 but showing a modified lower shell and a release button centrally located in the region of an edge element.

In the embodiment according to FIG. 8 the ridged edge 11 has been transposed to the side of the cassette 8 opposite the pivot hinge 12. Likewise, the release button 13 has been placed in a central region of the ridged edge 11. In principle it is also conceivable to provide for a laterally displaced arrangement of the release button 13 in the region of the ridged edge 11 which deviates from a symmetrical arrangement.

The embodiment according to FIG. 8 in particular makes it possible to place a retaining flange 22 of the release button 13 on a lower level with respect to the reference surface 5 opposite that region of the release button 13 which extends along the width of the ridged edge 11. In this way, it is possible to locate the retaining flange 22 below a level, which is generated by a lower boundary of a by-pack element, which is held in place in the region of the upper shell 10 and which extends above the compact disk 1, when the cassette 8 is closed. By doing this it is further possible to utilize by-pack elements with an approximately square outer boundary.

Figure 9:
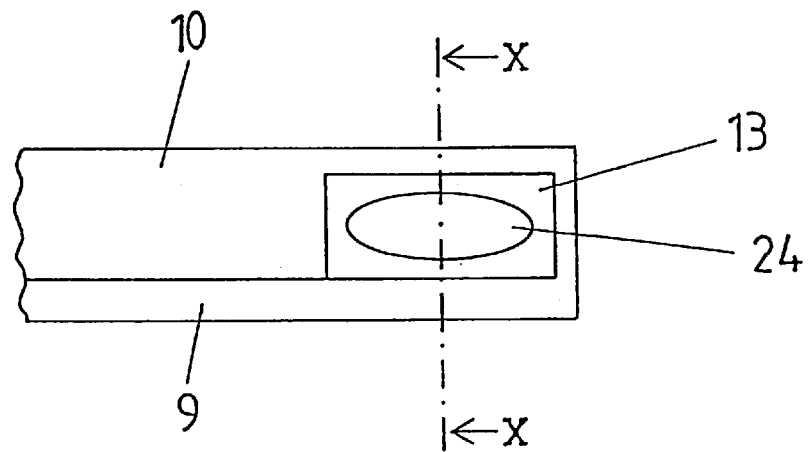
FIG. 9 is a fragmentary view of a cassette with a laterally positioned release button.

FIG. 9 shows a lateral arrangement of the release button 13. With that kind of an arrangement as well, it is possible to locate the release button 13 at such a low level relative to the by-pack element 23, which is held in place by the upper shell 10, that no changes in the geometry of the by-pack element 23 will be required and that the by-pack element 23 can be used with the usual square or rectangular outer contour.

Figure 10:
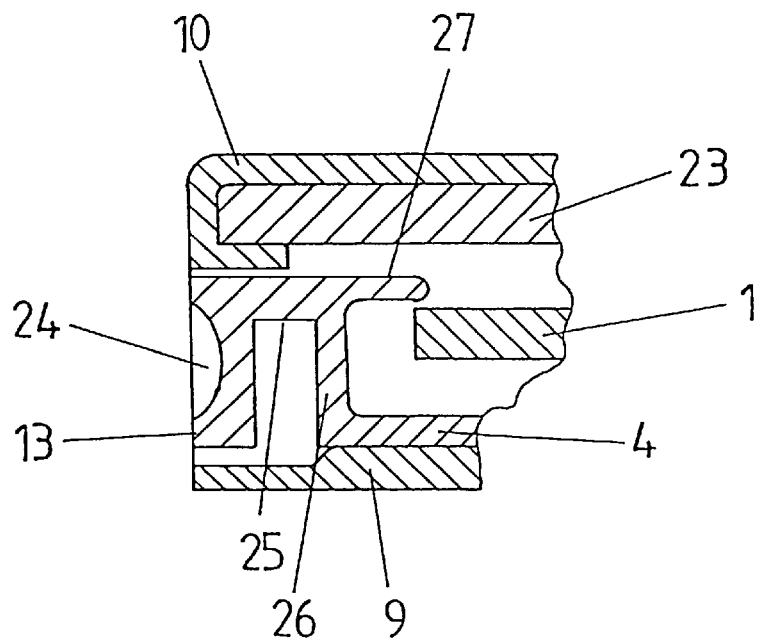
FIG. 10 is a fragmentary section view of the cassette shown in FIG. 9, the section being taken along a section line X—X.

FIG. 10 shows in a cross-sectional presentation a possible design for carrying out the release function. It can be seen that the release button 13 is equipped with an operating depression 24, which facilitates finger actuation. The release button 13 is connected by way of a horizontal ridge 25 and a vertical ridge 26 with the insert 4, with which the release button 13 forms a preferably one-piece structural element. With a retaining element 27 the release button 13 protrudes beyond the compact disk 1 in a starting position. After pressure is applied to the release button 13, the retaining element 27 pivots to the side in such a way that the compact disk is released. It is likewise possible, as an alternative or as an addition to the release of the compact disk 1, in the case of this embodiment as well, to lock the upper shell 10 relative to the lower shell 9. Such an embodiment is shown in FIG. 17 wherein release button 13 includes a profile 100 in the form of a projection which extends into a second profile 101 in the form of a recess. Profiles 100 and 101 cooperate to releasably retain upper shell 10 in a closed position relative to lower shell 9.

Figure 11:
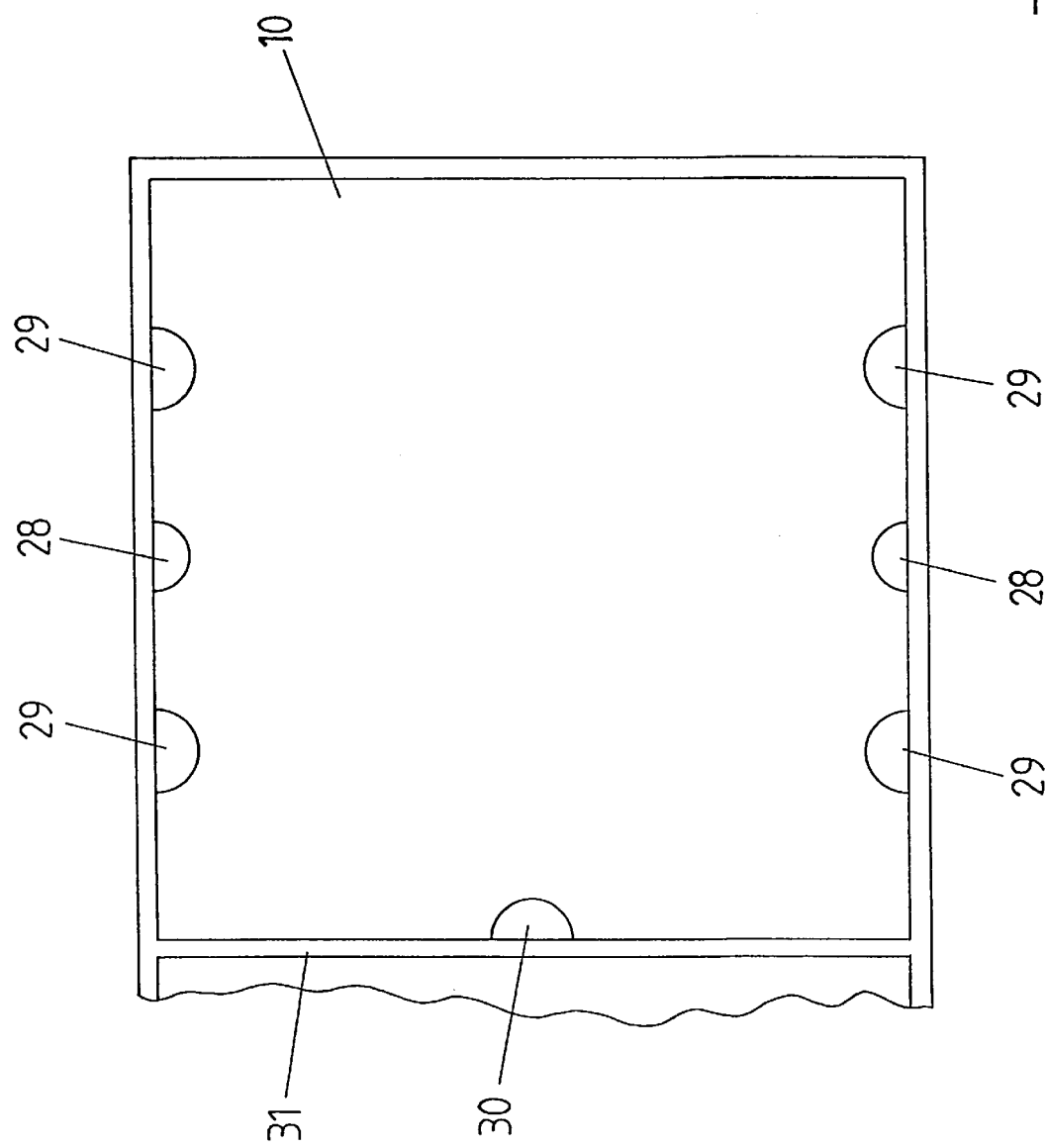
FIG. 11 is an interior view of the upper shell with laterally positioned contact pressure elements for exerting a force on an edge region of the compact disk.

FIG. 11 shows an open upper shell 10. It can be recognized that the upper shell 10 contains retaining protrusions 28, 29, 30, which have the function of holding the by-pack element 23 in place in the region of the upper shell 10. In this case, retaining protrusions 28, 29, 30 are dimensioned in such a way that it can be ensured that the retaining protrusions 28, 29, 30 are only imposed in those regions of the compact disk in which no information is stored. It is therefore useful to let the centrally located retaining protrusions 28 not protrude as far as the retaining protrusions 29 which are facing more toward the corners of the cassette 1.

It is also being contemplated to locate the support protrusion 30 in the region of a transverse ridge 31 of the upper shell 10 in order to generate a sequential lifting off of the various retaining protrusions 28, 29, 30 from the compact disk 1, when a pivoting movement of the upper shell 10 for opening the cassette 1 is carried out. In this way, a secure lift-off of the compact disk 1 is supported, because a lifting action of the compact disk 1 due to adhesion or the effects of negative pressures must be anticipated.

By arranging the retaining protrusions 28, 29, 30 at varying distances from the pivot hinge 12, it has been possible to see to it that the retaining protrusions 28, 29, 30, which are at a greater distance to the pivot hinge 12, already lift off from the compact disk 1, when the retaining protrusions 28, 29, 30, which are located at a smaller distance from the pivot hinge 12, still perform their retaining function and prevent the compact disk 1 from lifting off.

Figure 12:
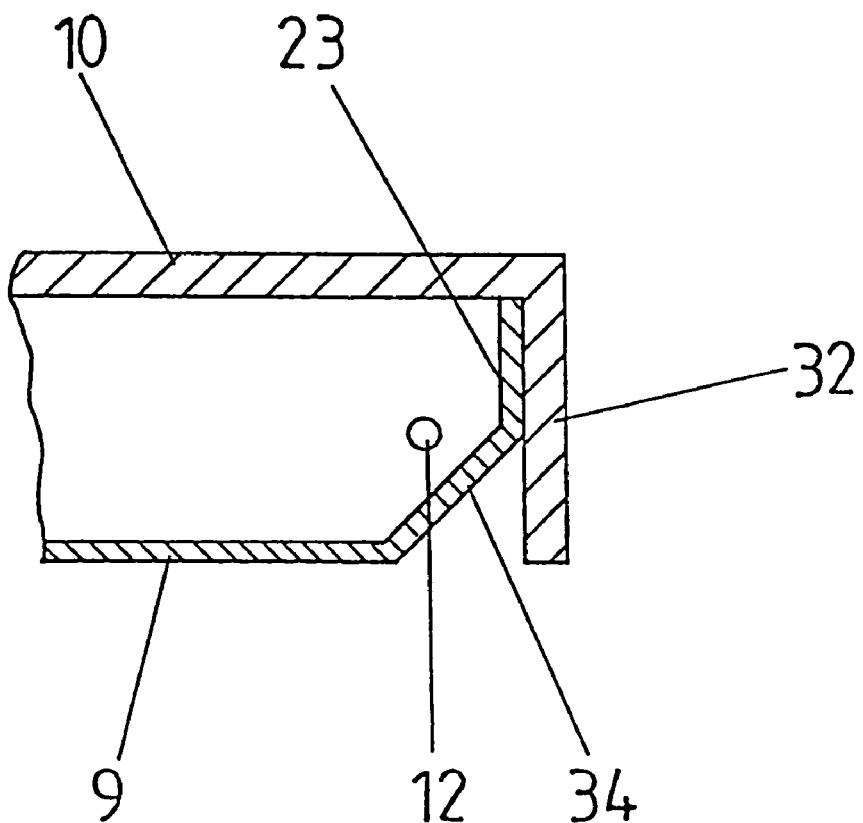
FIG. 12 is a fragmentary highly schematic section view of the embodiment shown in FIG. 8, the section being taken along line XII—XII in FIG. 8.

The cross-section in FIG. 12 illustrates that in the case of an arrangement of the pivot hinge 12 where it is positioned opposite the ridged edge 11 in the region of an edge of the lower shell 33, an angled portion 34 is provided in order to assist the opening movement of the upper shell 10. The angled portion 34 can be fashioned as a linear wall segment or rounded. In the case of the embodiment shown in FIG. 12, where the upper shell 10 includes an upper shell edge 32, it is possible to open the cassette 8 to a degree such that the opening angle of the upper shell 10 relative to the lower shell 9 is 90°. If a complete pivoting movement of the cassette 8 into an opening angel of 180° is to be facilitated, then it is necessary to generate an upper shell 10 without an upper shell edge 32 in the region of the pivot hinge 12.

Figure 13:
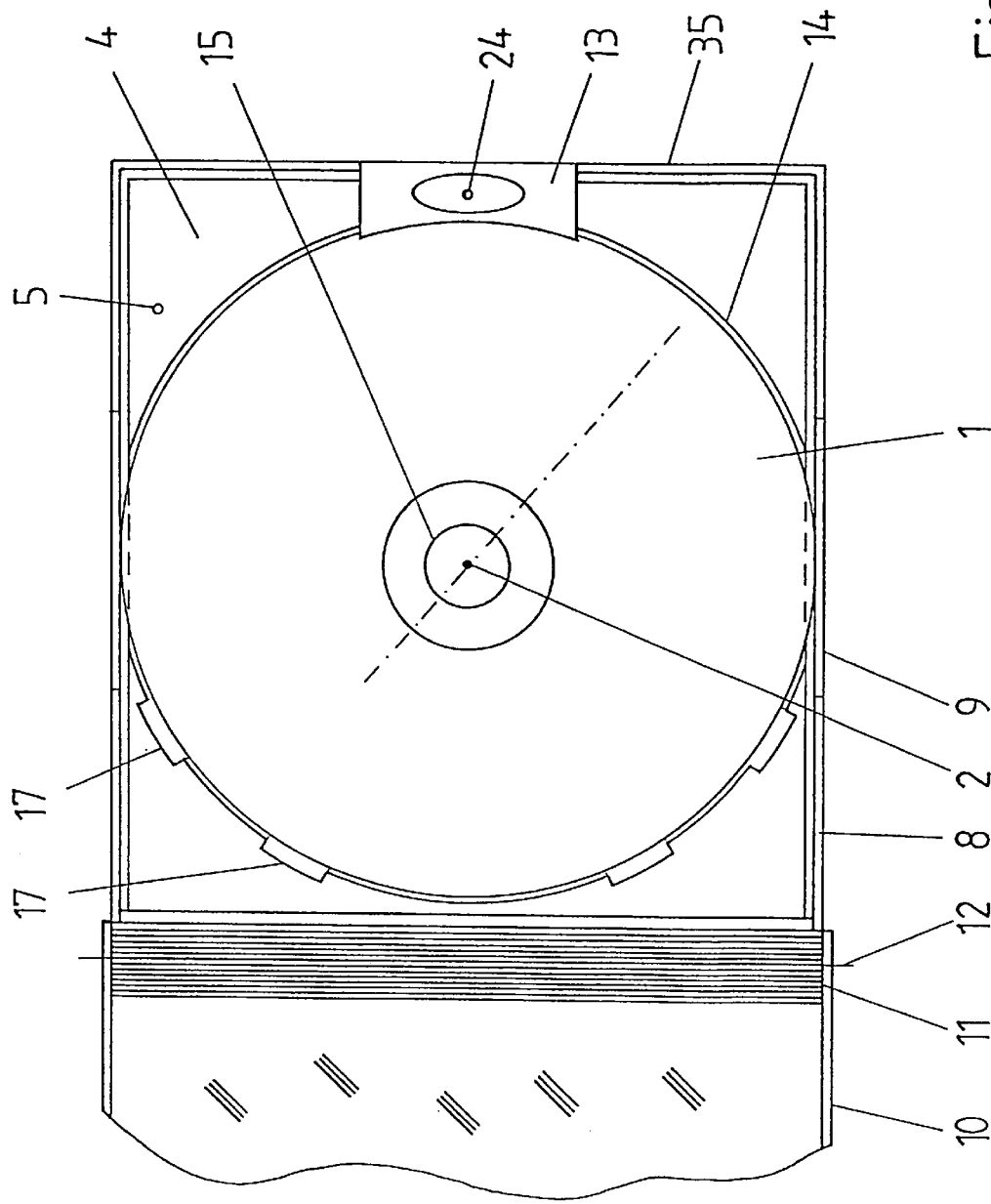
FIG. 13 is a view comparable to FIG. 3 with a release button positioned opposite the pivot hinge.

According to the embodiment of FIG. 13 the release button 13 is placed opposite the pivot hinge 12. In order to facilitate a use of rectangular by-pack elements 23 with standard dimensions, the release button 13 has a relatively small extension from an edge 35 of the lower shell 9 in the direction of the pivot hinge 12.

Figure 14:
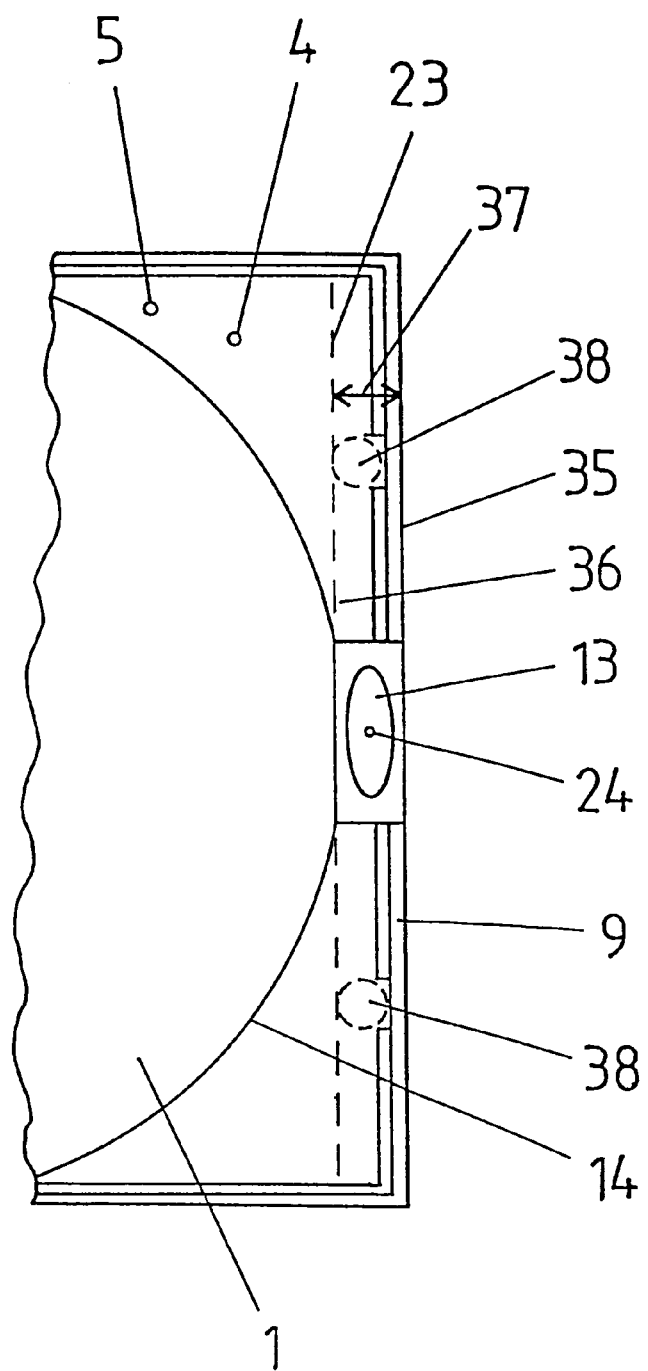
FIG. 14 is a fragmentary view of the right-hand region of a modified version of the device according to FIG. 13 where the release button is arranged in such a way that it is not superimposed on a by-pack element with standard dimensioning.

In FIG. 14 an embodiment is shown which is relatively similar to the embodiment of FIG. 13. In order to further illustrate the geometry, the by-pack element 23 is shown here additionally in dotted lines along with the element edge 36. The release button 13 is dimensioned in such a way that it extends from the edge 35 to the edge of element edge 36. If necessary, the release button 13 can also be made slightly smaller.

A distance 37 between the element edge 36 and the edge 35 is provided by the locking elements 38, which are molded in place at the upper shell 10 and which can be used to generate a clamping connection between the upper shell 10 and the lower shell 9, or between the upper shell 10 and the insert 4, which was inserted in the lower shell 9. But embodiments are also known, where the locking elements 38 are merely used for positioning the by-pack elements 23. As an alternative to the rounded construction of the locking elements 38, these can also be constructed as ridges in order to position the by-pack element 23 and, for example, they can extend transversely to edge 35 or at a distance from and parallel to edge 35.

According to another embodiment it is also possible that the release button 13 is merely provided for locking the compact disk 1 in place and that, when the release button 13 is actuated, no force is applied to the upper shell 10. The upper shell 10 in this embodiment, for example, can be locked in place relative to the lower shell 9 by means of button-like thickened portions 103 which are located in an edge region of the upper shell 10 or of the lower shell 9, and which can reach into correspondingly located depressions 105 of the appropriate other structural element as shown in FIG. 20.

Figure 15:
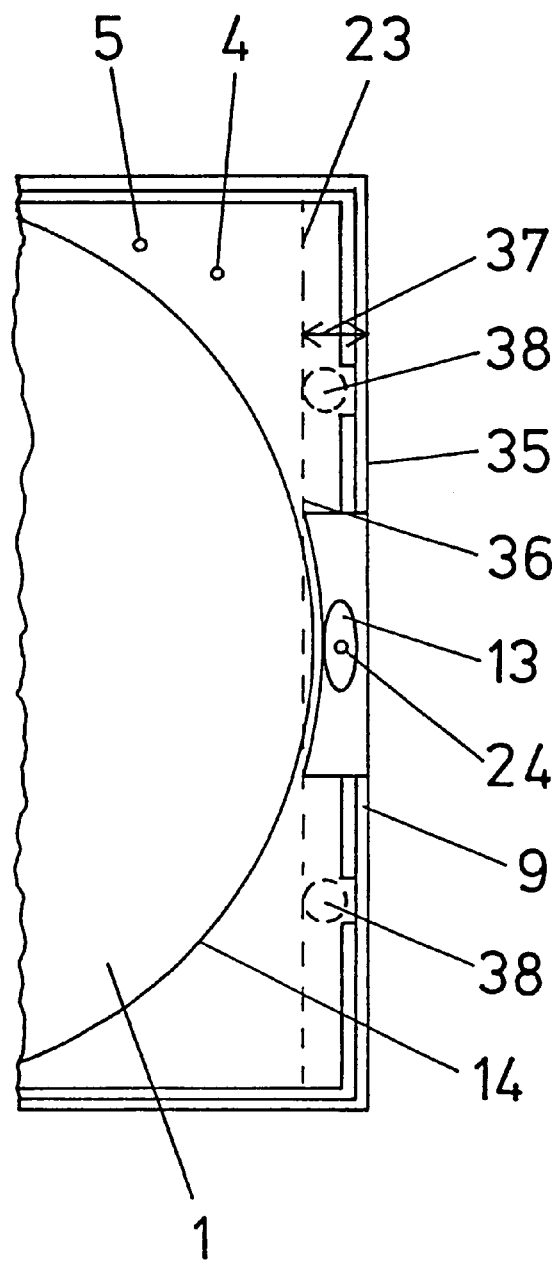
FIG. 15 is a further fragmentary view showing a variant of the embodiment of FIG. 14 where, however, no force is exerted on the compact disk by a button-like retaining element.

In FIG. 15 an embodiment is shown where the release button 13 performs no release function proper, but is merely constructed as a retaining element which protrudes through an opening of the upper shell 10. In particular, it is being contemplated in this embodiment to connect the release button 13 firmly with the plate-like insert 4 or to make these components as a single part by injection molding. In this embodiment the retaining element has the function of grasping the cassette prior to it being opened. An opening movement can be performed in a simple manner without the need for changing from one hand to the other. As shown in FIGS. 19 and 20, release button 13 is positioned within a rectangular opening 104 formed in upper shell 10 and may if desired also be provided with an edge profile 100 in the form of a projection which releasably cooperates with a profile 101 provided on upper shell 10 to retain upper shell 10 in a closed position with respect to lower shell 9.

In the case of this embodiment, it is especially advantageous to dimension the retaining element in such a way that it does not overlap the by-pack element 23, which can be received by the cassette, when the by-pack element is in its retaining position. This, too, aids the ability to use standardized by-pack elements 23. According to the embodiment in FIG. 15 it is contemplated that the retaining element, in the region where it faces the compact disk 1, be given a rounded contour so as to provide as large an operating surface of the retaining element as possible without impeding the removal of the compact disk 1. The compact disk 1 can be retained in a conventional manner, for example by means of locking elements in the region of a central opening. Such a retention of the compact disk 1 can also be achieved if the release button 13, according to another embodiment, only holds the upper shell 10 in place relative to the lower shell 9, and where no force is applied to compact disk 1 by the release button 13.

Figure 16:
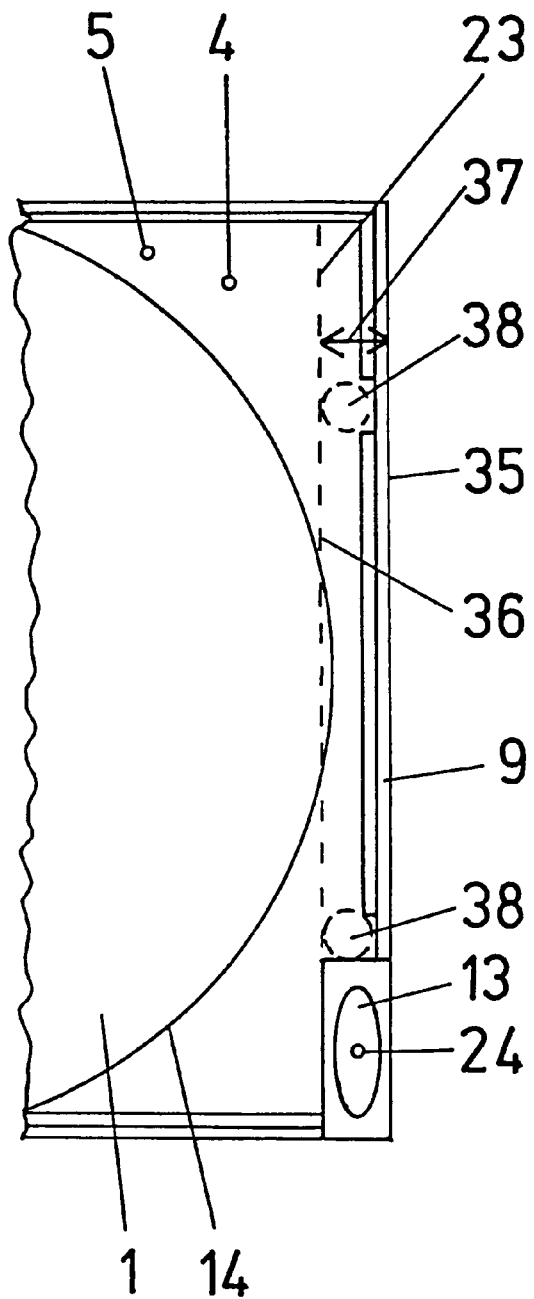
FIG. 16 is a fragmentary view of an embodiment where a retaining element, which protrudes through the upper shell is positioned in a corner region of the lower bowl.

A further variant of the embodiment of FIG. 15 is shown in FIG. 16. Here, too, the retaining element merely performs the function of supporting the handling ability without being in retaining contact with other components. FIG. 16 demonstrates in combination with FIG. 15 that, as far as the width of the cassette is concerned a nearly arbitrary arrangement of the retaining element is possible.

According to FIG. 15 a central arrangement can be provided; in FIG. 16 an arrangement in the region of a corner is shown. In principle, intermediate positions are also conceivable. Also, instead of a single retaining element, for example, two retaining elements at some distance from each other, can be provided.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

I claim:

1. A cassette for the storage of compact disks comprising:
   a lower shell;
   an upper shell pivotably connected to said lover shell, said upper shell having a substantially planar portion and a peripheral flange portion extending around the periphery of said planar portion;
   a release button provided on one of said lower and upper shells, said release button being movable between a first position in which said release button retains the upper shell in a fixed location relative to said lower shell and a second position in which said release button allows pivotable movement of said upper shell relative to said lower shell;
   said upper shell including a plurality of retaining projections extending inwardly from said flange portion, said retaining projections being operative to retain a compact disk in said cassette when said upper shell is in a closed position and to release said compact disk when said upper shell is in an open position, said retaining projections further being operative to retain a by-pack element within said upper shell and wherein the central opening of said compact disk is essentially free of overlapping retaining portions.

2. A cassette according to claim 1, characterized in that at least two of the retaining projections (28, 29, 30) are located at varying distances from a pivot hinge (12), which connects the upper shell (10) with the lower shell (9).

3. A cassette according to claim 1, characterized in that the release button (13) is located in a lateral region of the cassette (8).

4. A cassette according to claim 1, characterized in that the release button (13) in a locking position fixes the upper shell (10) relative to the lower shell (9) as well as the compact disk (1) within the cassette (8).

5. A cassette according to claim 1, characterized in that within the cassette (1) a retaining element (17) is located along an outer edge (14) of the compact disk (1).

6. A cassette according to claim 5, characterized in that in at least one corner region of the cassette (8) at least two retaining elements (17) are provided.

7. A cassette according to claim 1, characterized in that the retaining element (17) contains a boundary ridge (19) which protrudes inwardly, in certain regions, beyond an edge of said compact disk (1).

8. A cassette according to claim 7, characterized in that the boundary ridge (19) is shaped as a locking lug which has a lead-in taper (21).

9. A cassette according to claim 1, characterized in that the release button (13) is located in the region of a ridged edge (11) of the cassette (8).

10. A cassette according to claim 1, characterized in that the release button (13) is located opposite the pivot hinge (12).

11. A cassette according to claim 1, characterized in that the cassette (8) contains a cylindrical central element (3) which can be inserted into a central opening (2) of the compact disk.

12. A cassette according to claim 11, characterized in that the central element (3) includes an adjustment taper for positioning the compact disk (1) inside the cassette (8).

13. A cassette according to claim 11, characterized in that the central element (3) consists of ridges (6) which are elevated relative to a reference plane (5) and are positioned in circumferentially spaced relationship.

14. A cassette according to claim 3, characterized in that said cassette includes a by-pack element (23) having an element edge and the release button (13) has a width at a location extending inwardly from an outer edge (35) of the lower shell (9), said width corresponds approximately to a predetermined distance (37) which distance is equal to the distance between said edge (35) and an element edge (36) of said by-pack element (23) positioned most closely to said outer edge of said lower shell.

15. A cassette according to claim 14, characterized in that locking elements (38) are molded in one piece with the upper shell (10) and said predetermined distance (37) is no greater than the distance between said edge and a remote portion of said locking element.

16. A cassette for the storage of compact disks, which includes a lower shell and an upper shell a pivot mechanism pivotably connecting said upper shell to said lower shell, and where at least one retaining arrangement, in a closed position, protrudes through an opening in the upper shell, and in a release position allows the upper shell to be pivoted relative to the lower shell, said upper shell being adapted to retain a by-pack element therein characterized in that the retaining arrangement has a width extending inwardly from an edge of the lower shell (9), which is remote from the pivoting mechanism, said width being equal to or less than a distance between said edge of the lower shell (9), which is remote from the pivoting mechanism and said by-pack element, when said by-pack element is positioned in said upper shell.

17. A cassette according to claim 16, characterized in that the retaining arrangement is integrally formed with an insert member (4), said insert member being held in place by the lower shell.

18. A cassette according to claim 16, characterized in that the upper shell (10) can be held in said closed position by an edge profile relative to the lower shell (9).

19. A cassette according to claim 16, characterized in that the retaining arrangement is located in a central region of the longitudinal extension of the edge.

20. A cassette according to claim 16, characterized in that the retaining arrangement is placed in an offset position relative to a central region of the longitudinal extension of the edge.

21. A cassette according to claim 16, characterized in that the retaining arrangement is located in a corner region of the lower shell (9).

* * * * *